United States Patent
Mantri et al.

(10) Patent No.: US 11,447,410 B2
(45) Date of Patent: Sep. 20, 2022

(54) IRON SULFIDE SCALE CONTROL AGENT FOR GEOTHERMAL WELLS

(71) Applicant: ECOLAB USA, INC., St. Paul, MN (US)

(72) Inventors: Dinesh Mantri, Pune (IN); Jasbir S. Gill, Naperville, IL (US)

(73) Assignee: ECOLAB USA Inc., St. Paul, MN (US)

( * ) Notice: Subject to any disclaimer, the term of this patent is extended or adjusted under 35 U.S.C. 154(b) by 165 days.

(21) Appl. No.: 15/976,977

(22) Filed: May 11, 2018

(65) Prior Publication Data

US 2018/0327294 A1    Nov. 15, 2018

Related U.S. Application Data

(60) Provisional application No. 62/506,444, filed on May 15, 2017.

(51) Int. Cl.
*C02F 5/12* (2006.01)
*E21B 37/06* (2006.01)
(Continued)

(52) U.S. Cl.
CPC ............. *C02F 5/12* (2013.01); *C09K 8/528* (2013.01); *E21B 37/06* (2013.01); *F24T 10/20* (2018.05);
(Continued)

(58) Field of Classification Search
CPC ........ C02F 2101/101; C02F 5/10; C02F 5/12; C02F 2101/10; C02F 5/125;
(Continued)

(56) References Cited

U.S. PATENT DOCUMENTS

| 4,633,949 A | 1/1987 | Crowe |
| 4,650,591 A * | 3/1987 | Boothe ................. C23F 11/173 210/700 |

(Continued)

FOREIGN PATENT DOCUMENTS

| EP | 1881017 A2 | 1/2008 |
| WO | WO 2012/088240 A2 | 6/2012 |

(Continued)

OTHER PUBLICATIONS

Zahid Amjad, Ph.D. and Robert W. Zuhl, P.E., Selection and Application of Deposit Control Polymers as Iron Stabilization Agents in Industrial Water Treatment Programs, Association of Water Technologies, Inc. 19th Annual Convention & Exposition Nov. 7 to 10, 2007, 18 pages. (Year: 2007).*

(Continued)

*Primary Examiner* — Pranav N Patel
(74) *Attorney, Agent, or Firm* — Eric D. Babych; Barnes & Thornburg LLP

(57) ABSTRACT

The disclosure relates to improved methods for inhibiting the formation and deposition of sulfide and silica scale in aqueous systems. In particular, the methods include injecting a composition into an aqueous system or wellbore. The composition includes a sulfide scale inhibitor and a silica scale inhibitor. The sulfide scale inhibitor may be a copolymer of acrylic acid or methacrylic acid and an anionic monomer. The silica scale inhibitor may be a copolymer of acrylic acid or methacrylic acid and an alkoxylated monomer.

20 Claims, 1 Drawing Sheet

(51) Int. Cl.
*F24T 10/20* (2018.01)
*C09K 8/528* (2006.01)
*C02F 101/10* (2006.01)

(52) U.S. Cl.
CPC .......... *C02F 5/125* (2013.01); *C02F 2101/10* (2013.01); *C02F 2101/101* (2013.01); *C02F 2303/22* (2013.01)

(58) Field of Classification Search
CPC ..... C02F 2303/22; C09K 8/528; E21B 37/06; F24T 10/20; Y02E 10/10
See application file for complete search history.

(56) References Cited

U.S. PATENT DOCUMENTS

| | | | |
|---|---|---|---|
| 4,933,090 A | 6/1990 | Gill et al. | |
| 5,264,141 A | 11/1993 | Brezinski et al. | |
| 5,266,186 A | 11/1993 | Kaplan | |
| 5,403,493 A * | 4/1995 | Mouche | C02F 5/12 166/244.1 |
| 6,017,994 A | 1/2000 | Carter et al. | |
| 6,375,907 B1 | 4/2002 | Gallup | |
| 6,525,011 B2 | 2/2003 | Brezinski | |
| 7,270,180 B2 | 9/2007 | Ke et al. | |
| 7,398,824 B1 | 7/2008 | Wang et al. | |
| 8,703,655 B2 | 4/2014 | Lehmann et al. | |
| 2003/0052303 A1 * | 3/2003 | Buentello | C02F 5/10 252/175 |
| 2003/0199397 A1 | 10/2003 | Zaid et al. | |
| 2005/0067164 A1 * | 3/2005 | Ke | C09K 8/528 166/304 |
| 2006/0124301 A1 | 6/2006 | Gupta et al. | |
| 2006/0124302 A1 | 6/2006 | Gupta et al. | |
| 2006/0180789 A1 | 8/2006 | Jones et al. | |
| 2008/0011687 A1 | 1/2008 | Campo et al. | |
| 2009/0082535 A1 | 3/2009 | Nakano et al. | |
| 2009/0143252 A1 | 6/2009 | Lehmann et al. | |
| 2009/0294374 A1 | 12/2009 | Gill et al. | |
| 2010/0051559 A1 * | 3/2010 | Musale | C02F 5/12 210/701 |
| 2010/0294984 A1 | 11/2010 | Peng et al. | |
| 2011/0253628 A1 * | 10/2011 | Blokker | C02F 5/12 210/638 |
| 2012/0080641 A1 | 4/2012 | Relenyi | |
| 2012/0161068 A1 | 6/2012 | Greene et al. | |
| 2014/0209510 A1 * | 7/2014 | Harrington | C10G 29/20 208/207 |
| 2015/0080275 A1 | 3/2015 | Todd et al. | |
| 2016/0096908 A1 | 4/2016 | Wang et al. | |
| 2016/0185636 A1 * | 6/2016 | Musale | C08L 31/00 210/639 |
| 2016/0333252 A1 | 11/2016 | Brinkman et al. | |

FOREIGN PATENT DOCUMENTS

| | | |
|---|---|---|
| WO | WO 2013/019627 A1 | 2/2013 |
| WO | WO 2014/209722 A1 | 12/2014 |
| WO | WO 2016/155967 A1 | 10/2016 |
| WO | WO 2016/174413 A1 | 11/2016 |
| WO | WO 2016/174414 A1 | 11/2016 |
| WO | WO 2016/180563 A1 | 11/2016 |
| WO | WO 2016/182980 A1 | 11/2016 |

OTHER PUBLICATIONS

I.R. Collins; M.M. Jordan, Occurance, Prediction And Prevention Of Zinc Sulfide Scale Within Gulf Coast And North Sea High Temperature/High Salinity Production Wells, Paper presented at the International Symposium on Oilfield Scale, Aberdeen, United Kingdom, Jan. 2001.Paper No. SPE-68317-MS (Year: 2001).*

Scale Control in Geothermal Brines—New Inhibitors for Calcium Carbonate and Silica Control, By Jasbir S. Gill, Ph.D., Nalco, an Ecolab Company, Accepted for Presentation and Publication in Transactions of Geothermal Resources Council 2008 Annual meeting Oct. 5-8, 2008. (Year: 2008).*

Aften, Carl W. et al., "New Compounds for Hydrogen Sulfide Scavenging and Iron Sulfide Control," Society of Petroleum Engineers, SPE 141286, 2011, pp. 1-20.

Changqing, Lu, et al., "Study on the Syntheses and Performances of Sulphonated Copolymers Used As Scale Inhibitors," Proceedings of the 9$^{th}$ European Symposium on Corrosion Inhibitors, vol. 1; Ferrara, Italy; Sep. 4-8, 2000, 9 pages.

Harmandas, N.G. et al., "Crystal Growth of Pyrite in Aqueous Solutions. Inhibition by Organophosphorus Compounds," Langmuir, 1998, 14(5): 1250-1255.

"New Sulfur Acids Findings from W.Y. Guo and Colleagues Discussed (Preparation of Scale Inhibitor by Using the Waste of Refined 2-Acrylamido-2-Methylpropane Sulfonic Acid)," Energy Weekly News, Sep. 2, 2016, 2 pages.

Sun, Wei et al., "Kinetics of Iron Sulfide and Mixed Iron Sulfide/Carbonate Scale Precipitation in $CO_2/H_2S$ Corrosion," Institute for Corrosion and Multiphase Technology, Corrosion NACExpo 2006, 61$^{st}$ Annual Conference & Exposition, Paper 06644, pp. 1-26.

Wang, Xian-ge, et al., "Properties and Mechanism of a Compound Scale Inhibitor," Journal of Northeastern University (Natural Science), Jun. 2010, 31(6): 909-912.

Fu, Chang'e, et al., "Synthesis of capped polyether macromonomers and their copolymers as antiscalants for calcium phosphage," *CIESC Journal*, 64(7):2687-2695 (Jul. 2013).

International Search Report and Written Opinion for corresponding International Application No. PCT/US2018/032190, 10 pages (dated Jul. 27, 2018).

* cited by examiner

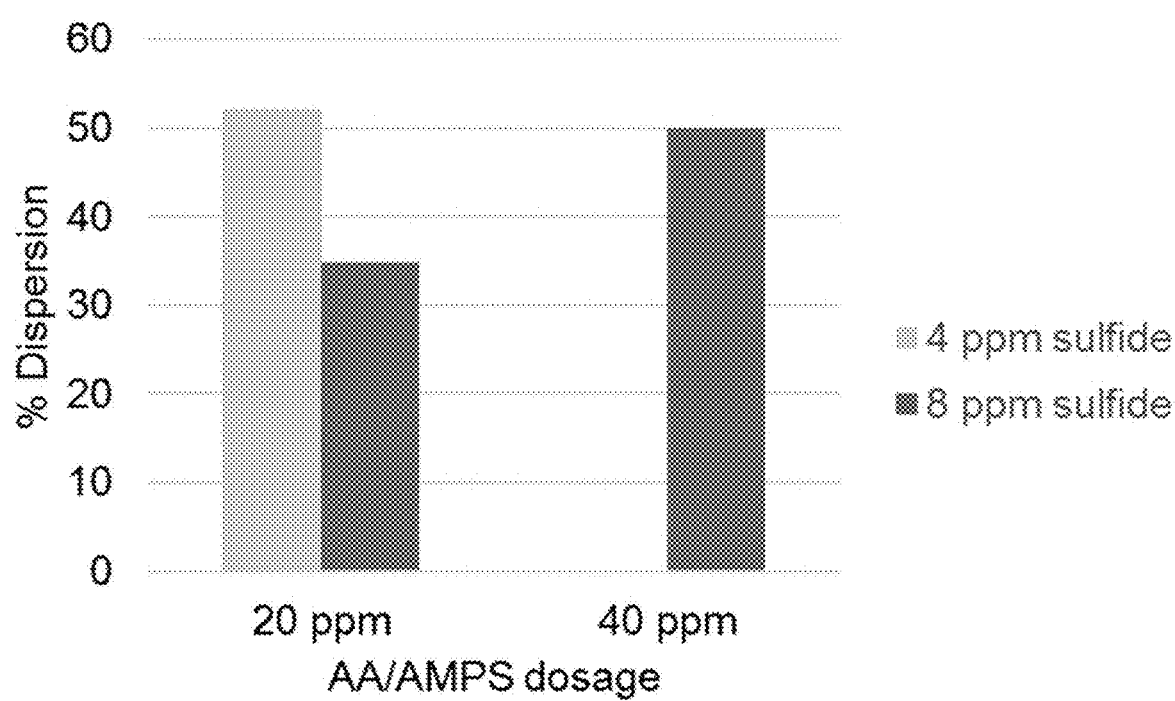

IRON SULFIDE SCALE CONTROL AGENT FOR GEOTHERMAL WELLS

BACKGROUND

1. Field of the Invention

The present invention relates to methods of using a combination of chemical compounds to inhibit or reduce sulfide and silica scale in aqueous systems.

2. Description of the Related Art

Geothermal energy is energy in the form of heat within the earth's interior, which can be tapped using geothermal wells. The earth's interior contains an enormous supply of heat, but challenges remain in extracting the heat for generating energy. Geothermal energy moves towards the earth's surface by thermal conduction through solid rock. Thermal energy can also be transmitted towards the earth's surface by movement of molten rock or by circulation of fluid ($H_2O$ as steam or water) through interconnected fractures and pores. Geothermal wells are in any instance relatively deep wells.

Geothermal brines and steam are generally used as the energy source. Geothermal brine is used in power generation, heating and electrical processes. Geothermal steam temperatures range from about 185° C. to about 370° C. (about 365° F. to about 700° F.). Steam is separated from the brine using flashing units. Low temperature brines can also be used to produce electricity binary units (secondary fluid units). The geothermal brines can have a salinity from less than about 1000 ppm to several hundred thousand ppm, and a content of non-condensable gases up to about 6 percent. Depending upon the salt content and application, geothermal fluids may be used directly or through a secondary fluid cycle. The use of geothermal energy as an energy source has risen in importance as other energy sources become less abundant and more expensive. This is a sustainable renewable source of energy, and unlike other renewable sources, geothermal energy is constantly available. Some geothermal steam power stations can generate up to about 250 MW.

Mineral deposition is a major problem under the severe conditions encountered in the production of geothermal energy and can be a factor limiting the development of geothermal fields. Mineral deposition from the boiling geothermal fluid of a water-dominated reservoir is particularly a problem.

Hydrogen sulfide ($H_2S$) is a naturally occurring contaminant of fluids or produced by sulfur reducing bacteria. The corrosive nature of $H_2S$ causes the accumulation of particulate iron sulfide. Iron compounds, including iron sulfide can form within pipeline networks that transport gas, oil, water and mixtures of gas, oil and water. The iron sulfide compounds are physically characterized as appearing to be amorphous solid particles capable of absorbing water.

Iron sulfide becomes entrained in hydrocarbons, glycol, salts, and the like to form deposits on the surfaces of conduits such as pipelines. Sulfide scales may be present in different forms such as antimony and iron sulfide scale.

The iron sulfide particles can adhere to the internal surfaces of pipeline networks and associated process equipment. The physical characteristic of the iron sulfide deposits can vary from a viscous oil coated mass to a dry black powder form. The buildup of iron and iron sulfide deposits over time can lead to a range of operational problems. The deposits can hinder accurate determinations of pipeline structural integrity and the pipelines must be cleaned physically. The presence of iron and iron sulfide deposits can lead to increased corrosion rates within pipeline networks. The deposits can also interfere with the safe operation of pipeline valving systems, potentially leading to catastrophic system failures. Therefore, cleaning is common practice in pipeline networks containing iron and iron sulfide deposits.

Silica scale deposition in wells is also a problem. Amorphous silica scales cause significant fouling problems when industrial waters contain high quantities of silica. For the most part, high quantities of silica means that the industrial waters contain at least about 5 ppm and up to about 500 ppm dissolved silica and may contain higher quantities of silica either in dissolved, dispersed, or colloidal forms. The silica and sulfide deposits may occur individually, mixed together, or mixed with other metal ions, such as iron, antimony, copper, etc.

The scale-deposit problems are presently being countered primarily by the down-hole addition of scale inhibitor chemicals, although other techniques are being implemented, such as acidizing produced fluids and adding carbon dioxide under pressure. Mechanical methods have also been explored.

BRIEF SUMMARY

In some embodiments of the present disclosure, a method is provided for sulfide and silica scale inhibition or reduction in an aqueous system by injecting a composition into the aqueous system, wherein the composition comprises a sulfide scale inhibitor and a silica scale inhibitor.

In some embodiments of the present disclosure, a method is provided for sulfide and silica scale inhibition or reduction in a wellbore by injecting a composition into the wellbore, wherein the composition comprises a sulfide scale inhibitor and a silica scale inhibitor.

The present disclosure also provides the use of a composition for sulfide and silica scale inhibition or reduction wherein the composition comprises a sulfide scale inhibitor and a silica scale inhibitor.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE DRAWINGS

A detailed description of the invention is hereafter described with specific reference being made to the drawings in which:

FIG. 1 shows the effect of sulfide concentration on inhibition performance.

DETAILED DESCRIPTION

Various embodiments are described below. The relationship and functioning of the various elements of the embodiments may better be understood by reference to the following detailed description. However, embodiments are not limited to those illustrated below. In certain instances details may have been omitted that are not necessary for an understanding of embodiments disclosed herein.

Sulfide scale is less common than sulfate and carbonate scale but it also causes significant production problems in geothermal power plants. Sulfide salts typically have much lower solubility than conventional calcium sulfate and calcium carbonate scale. The most common type of sulfide scale is iron sulfide. Iron forms a variety of binary compounds with sulfur in contrast to other sulfide scales, such as lead sulfide and zinc sulfide, which form single sulfides. Many types of iron sulfides form in $H_2S$ rich environments including Troilite, Pyrrhotite, Mackinawite, Greigite, Pyrite, and Marcasite. Iron sulfide scales can transform from one form to another depending on physical conditions. Sulfide scales have been reported much more frequently in the last three decades, and more field cases are reporting that sulfide scale dominates other scale.

Aqueous systems may form deposits of scale that include a mixture of different compounds, such as iron, sulfide, and silica. Mixed deposits containing sulfide scale may be resistant to sulfide scale inhibitors if not used in combination with other scale inhibitors. However, individual scale inhibitors used in combination with other scale inhibitors may lose their function because of unpredictable interactions between the inhibitors or between the mixture of inhibitors and the scale deposits. Therefore, there is a need for compositions of scale inhibitors that can inhibit or reduce mixed scale deposits.

The present disclosure relates to compositions for inhibiting or reducing sulfide and silica scale deposits in aqueous systems. In some embodiments, the aqueous system may be a geothermal well or geothermal power plant. Iron sulfide scale is a major challenge in geothermal wells because it impacts power generation and decreases efficiency.

In some embodiments of the present disclosure, a method is disclosed for sulfide and silica scale inhibition or reduction in an aqueous system. In some embodiments the method may include injecting a composition into the aqueous system. The composition may include a sulfide scale inhibitor and a silica scale inhibitor. In some embodiments, the sulfide scale inhibitor and a silica scale inhibitor may be injected into the aqueous system together or separately in any sequence.

In some embodiments, the aqueous system may comprise cooling waters, geothermal waters, salt water for desalinization purposes, industrial waters being prepared for boiler treatment and steam generation, downhole waters for petroleum crude recovery, pulp and paper mill waters, or mining and mineral processing waters. The problem of amorphous silica scale formation on the surfaces in contact with these industrial waters is particularly noted when the industrial waters are alkaline, having a pH of at least about 5.0 or above, and contain at least about 5 ppm total silica as $SiO_2$.

In some embodiments, the scale inhibitors are injected in geothermal wells via feed lines that may be generally formed of stainless steel or a highly corrosion-resistant alloy. The feed lines pass through the upwardly-flowing production stream and are the tubes through which the scale inhibitors are pumped downhole to the site at which the scale inhibitors are injected into the production stream. The fluids of the production stream are extremely hot, having temperatures on the order of from about 200° C. to about 260° C. (about 400° F. to about 500° F.), and the feed line temperatures likewise may reach temperatures from about 200° C. to about 260° C.

In some embodiments, the composition may be injected at a point in the wellbore that may be from about 200 to about 400 feet below the lowest encountered scale formation site (generally the flash zone). This may be to ensure that the feed point is sufficiently ahead of the scale deposit area so that the inhibitor is adequately admixed in the production fluid when the first problem area is reached. A geothermal well itself may extend at least about 1 or 2 km (about 3,280 or 6,560 feet), and may be considerably deeper. Scale inhibitor feed lines that are from about 3,000 to about 5,000 feet long are not unusual. Scale inhibitor residence times in the feed lines may be from about 20 to about 30 minutes or longer.

In certain embodiments, the composition may be injected into a condenser in the aqueous system. The condenser may contain water or brine. The brine may include iron, sulfide, and silica.

In some embodiments, the composition may be injected into a separator in the aqueous system. The separator may contain water or brine.

In some embodiments, the aqueous system may be a geothermal system. In other embodiments, the geothermal system may be a geothermal power plant, such as a dry steam station, a flash steam station, or a binary cycle station.

In some embodiments, the aqueous system may include brine.

In other embodiments, the sulfide scale may be iron sulfide, antimony sulfide, lead sulfide, zinc sulfide, or any combination thereof. The sulfide scale may be iron sulfide, antimony sulfide, or any combination thereof.

In certain embodiments, a method is disclosed for sulfide and silica scale inhibition or reduction in a wellbore. The method may include injecting a composition into the wellbore. The composition may include a sulfide scale inhibitor and a silica scale inhibitor.

In some embodiments, the sulfide scale inhibitor may include a copolymer of acrylic acid or methacrylic acid and an anionic monomer.

In other embodiments, the anionic monomer may be 2-acrylamido-2-methylpropane sulfonic acid (AMPS), styrene sulfonic acid, 2-methyacrylimido-2-methylpropylsulfonic acid, vinyl sulfonic acid, sulfoalkyl acrylate, sulfoalkyl methacrylate, allyl sulfonic acid, 3-methacrylamido-2-hydroxypropylsulfonic acid, any salt thereof, or any combination thereof.

In other embodiments, the anionic monomer may be 2-acrylamido-2-methylpropane sulfonic acid (AMPS), styrene sulfonic acid, 2-methyacrylimido-2-methylpropylsulfonic acid, vinyl sulfonic acid, 3-methacrylamido-2-hydroxypropylsulfonic acid, any salt thereof, or any combination thereof. The anionic monomer may be AMPS.

In some embodiments, the sulfide scale inhibitor may be a copolymer. The copolymer may include from about 40% to about 80% by weight of acrylic acid and from about 20% to about 60% by weight of AMPS. In other embodiments, the scale inhibitor may be a copolymer of about 60% by weight acrylic acid and about 40% by weight AMPS.

In some embodiments, the silica scale inhibitor may include a copolymer of acrylic acid or methacrylic acid and an alkoxylated monomer. More specifically, the alkoxylated monomer can be derivatized from either ethylene oxide, propylene oxide, or any combination thereof. Average substitution ranges may range from about 4 to about 20 mole percent.

In other embodiments, the alkoxylated monomer may be hydroxypolyethoxy allyl ether (AAE), 3-allyloxy-1,2-propanediol, diethylene glycol monoallyl ether, tetraethylene glycol methyl vinyl ether, ethylene glycol vinyl ether, polyethoxy methacrylate, 1-allyloxy-2-hydroxypropane sulfonic acid, any salt thereof, or any combination thereof.

In some embodiments, the alkoxylated monomer may be hydroxypolyethoxy allyl ether (AAE), 3-allyloxy-1,2-propanediol, tetraethylene glycol methyl vinyl ether, polyethoxy methacrylate, any salt thereof, or any combination thereof.

In some embodiments, the alkoxylated monomer may be hydroxypolyethoxy allyl ether (AAE), 3-allyloxy-1,2-propanediol, any salt thereof, or any combination thereof.

In some embodiments, the alkoxylated monomer may be hydroxypolyethoxy (10) allyl ether (AAE-10).

In some embodiments, the silica scale inhibitor may be a copolymer that may include from about 30% to about 70% by weight of acrylic acid and from about 30% to about 70% by weight of AAE-10.

In other embodiments, the silica scale inhibitor may be a copolymer of about 50% by weight of acrylic acid and about 50% by weight of AAE-10.

In some embodiments, the composition injected into the aqueous system consists of a sulfide scale inhibitor and a silica scale inhibitor. In other embodiments, the composition consists of a copolymer including from about 40% to about 80% by weight of acrylic acid and from about 20% to about 60% by weight of AMPS and another copolymer that may include from about 30% to about 70% by weight of acrylic acid and from about 30% to about 70% by weight of AAE-10. In some embodiments, the composition consists of a sulfide scale inhibitor and a silica scale inhibitor, wherein the sulfide scale inhibitor may be a copolymer of about 60% by weight acrylic acid and about 40% by weight AMPS, and wherein the silica scale inhibitor may be a copolymer of about 50% by weight of acrylic acid and about 50% by weight of AAE-10.

In some embodiments, the weight average molecular weight of the sulfide scale inhibitor may range from about 1,000 Da to about 100,000 Da. In certain embodiments, the weight average molecular weight of the sulfide scale inhibitor may range from about 10,000 Da to about 20,000 Da or from about 14,000 Da to about 16,000 Da. The weight average molecular weight of the copolymers is determined using size exclusion chromatography.

In other embodiments, the weight average molecular weight of the silica scale inhibitor may range from about 1,000 Da to about 100,000 Da. In certain embodiments, the weight average molecular weight of the sulfide scale inhibitor may range from about 10,000 Da to about 20,000 Da or from about 14,000 Da to about 16,000 Da. The weight average molecular weight of the copolymers is determined using size exclusion chromatography.

In certain embodiments, the sulfide scale inhibitor may be added in an amount ranging from about 1 ppm to about 500 ppm and the silica scale inhibitor may be added in an amount ranging from about 1 ppm to about 100 ppm.

In some embodiments, the sulfide scale inhibitor may be added in an amount ranging from about 1 ppm to about 100 ppm, about 5 ppm to about 100 ppm, about 5 ppm to about 50 ppm, about 5 ppm to about 40 ppm, about 10 ppm to about 100 ppm, about 10 ppm to about 50 ppm, or about 10 ppm to about 40 ppm. In some embodiments, the sulfide scale inhibitor may be added in an amount of about 20 ppm, about 30 ppm, about 40 ppm, or about 50 ppm.

In certain embodiments, the silica scale inhibitor may be added in an amount ranging from about 1 ppm to about 100 ppm, about 1 ppm to about 50 ppm, or about 1 ppm to about 25 ppm. In some embodiments, the silica scale inhibitor may be added in an amount ranging from about 100 ppm to about 10,000 ppm. In some embodiments, the silica scale inhibitor may be added in an amount of about 20 ppm, about 30 ppm, about 40 ppm, or about 50 ppm.

In other embodiments, the compositions of this disclosure may be injected into the aqueous system as aqueous solutions of scale inhibitor actives. Such compositions may contain from about 15 to about 70 weight percent actives. In certain embodiments, the compositions may contain from about 20 to about 30 weight percent actives. In some embodiments, the aqueous compositions of scale inhibitors may be introduced into the feed line of a geothermal well, for delivery downhole, at actives concentrations of about 1 to about 15 weight percent. The actives concentration may be adjusted by injecting an aqueous diluent along with the composition or to flush the feed lines.

In some embodiments, the composition may include additional additives, such as a hydrogen sulfide scavenger, a corrosion inhibitor, a dispersant, a gas hydrate inhibitor, a biocide, a surfactant, a solvent, an inert tracer, or any combination thereof.

In other embodiments, the composition may include one or more corrosion inhibitors, one or more other scale inhibitors, one or more fluorescent tracers, one or more water treatment polymers, one or more polyalkoxy compounds, or any other suitable additive or additional component. In alternative embodiments, such additives may be added simultaneously or sequentially with the polymers of the invention.

In some embodiments, the composition may include an inert tracer, making it compatible with fluorescent tracing technology such as 3D TRASAR® technology (available from Nalco® Company, Naperville, Ill., USA). In other embodiments, an inert fluorescent tracer may be included in the composition to provide a means of determining the dosage level. A known proportion of the fluorescent tracer may be added either simultaneously or sequentially with the scale inhibitors in the composition. Effective inert fluorescent tracers may include those substances that are chemically non-reactive with other components in the system and that do not significantly degrade with time.

Representative inert fluorescent tracers include fluorescein or fluorescein derivatives; rhodamine or rhodamine derivatives; naphthalene sulfonic acids (mono-, di-, tri-, etc.); pyrene sulfonic acids (mono-, di-, tri-, tetra-, etc.); stilbene derivatives containing sulfonic acids (including optical brighteners); biphenyl sulfonic acids; phenylalanine; tryptophan; tyrosine; vitamin B2 (riboflavin); vitamin B6 (pyridoxin); vitamin E (a-tocopherols); ethoxyquin; caffeine; vanillin; naphthalene sulfonic acid formaldehyde condensation polymers; phenyl sulfonic acid formaldehyde condensates; lignin sulfonic acids; polycyclic aromatic hydrocarbons; aromatic (poly)cyclic hydrocarbons containing amine, phenol, sulfonic acid, carboxylic acid functionalities in any combination; (poly)heterocyclic aromatic hydrocarbons having N, O, or S; a polymer containing at least one of the following moieties: naphthalene sulfonic acids, pyrene sulfonic acids, biphenyl sulfonic acids, or stilbene sulfonic acids.

In other embodiments, the compositions may include additional scale inhibitors to disperse scales other than sulfide and silica. These additional scale inhibitors may include, but are not limited to, inorganic and organic polyphosphate, phosphonates, and polycarboxylates. These inhibitors may help inhibit or disperse other scales such as calcium carbonate, calcium sulfate, calcium phosphate, calcium fluoride, barium sulfate, calcium oxalate, and the like.

In certain embodiments, the disclosed methods may be combined with other utilities known in the industry. Representative utilities include sensors for measuring the content of various additives in the system; dissolved or particulate contaminant sensors; other sensors based upon resistance, capacitance, spectroscopic absorbance or transmittance, calorimetric measurements, and fluorescence; and mathematical tools for analyzing sensor/controller results (e.g. multivariate analysis, chemometrics, on/off dosage control, PID dosage control, the like, and combinations thereof).

EXAMPLES

Example 1

Scale inhibition and iron dispersion was tested using a laboratory protocol. Brines were prepared containing sulfide and iron. The polymers were added to the brine in amount of about 10 ppm. The control contained no scale inhibitors. Dispersion of iron was determined visually for different polymers or mixtures of polymers (see Table 1).

TABLE 1

Iron dispersion of different polymers or polymer mixtures.

| Polymer | % Dispersion |
|---|---|
| Control | 0 |
| Polymethacrylic acid and a copolymer of acrylic acid and AMPS* 903 | 38 |
| Copolymer of acrylic acid (60%) and AMPS (40%) | 69 |
| Copolymer of acrylic acid (50%) and Maleic Anhydride (50%) 116 | 15 |
| Copolymer of Maleic Anhydride and sulfo styrene 310 | 35 |
| Polyamino polyether methylene phosphonic acid and a copolymer of acrylic acid and AMPS* 00 m | 22 |

*50/50 blend by weight of the two polymers

Example 2

A copolymer of acrylic acid and AMPS (AA/AMPS; 60/40 by weight) was added to brine in an amount of about 20 ppm for about 16 hours. Even after about 16 hours, greater than about 80% of the iron remained dispersed in the brine containing the copolymer. In the control, about 10 ppm of iron in the form of iron sulfide precipitated. At about 20 ppm, the copolymer exhibited about 52% inhibition of iron sulfide precipitate.

Example 3

Experiments were conducted with higher amounts of sulfide in the brine. Interestingly, a higher concentration of AA/AMPS (60/40) was required to inhibit scale formation when there was a higher concentration of sulfide in the brine (See FIG. 1). A dosage of 40 ppm of the copolymer was needed to inhibit 50% of the iron sulfide precipitate.

Example 4

Experiments were conducted to evaluate the effect of temperature on dispersion efficacy (Table 2). Dispersion efficacy was tested at about 25° C. and about 80° C. The percent of iron dispersed was evaluated at about 30 min and about 16 hours. There was no difference in precipitation in the control at the different temperatures.

TABLE 2

Effect of temperature on Iron dispersion.

| | Temp: 80° C. | | Temp: 25° C. | |
|---|---|---|---|---|
| | Fe (ppm) | % dispersion | Fe (ppm) | % dispersion |
| Blank | 23.2 | 0 | 23.2 | 0 |
| Control | 7 | 0 | 7.2 | 0 |
| 5 ppm AA/AMPS | 7.5 | 3.1 | 7.6 | 2.5 |
| 10 ppm AA/AMPS | 16.4 | 58 | 18 | 67.5 |
| 20 ppm AA/AMPS | 20.5 | 83.3 | 17.9 | 66.9 |
| 30 ppm AA/AMPS | 19.6 | 77.8 | 18.5 | 70.6 |

Example 5

A solution was prepared that formed mixed deposits of silica/iron silicate and iron sulfide. Table 3 shows that when the copolymers are mixed together they inhibited precipitation of mixed deposits to a greater extent than the sum of the individual polymers.

TABLE 3

Synergism of copolymer mixture against mixed scale.

| Copolymer of AA/AAE-10 (50/50) | Copolymer AA/AMPS (60/40) | % inhibition |
|---|---|---|
| 0 ppm | 20 ppm | 30 |
| 20 ppm | 0 ppm | 27 |
| 10 ppm | 10 ppm | 79 |
| 20 ppm | 20 ppm | 88 |

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method for sulfide and silica scale inhibition or reduction in an aqueous system, comprising:
injecting a composition into the aqueous system, wherein the aqueous system comprises a temperature of about 185° C. to about 370° C., wherein the composition comprises a sulfide scale inhibitor and a silica scale inhibitor, wherein the sulfide scale inhibitor is added in the aqueous system in an amount ranging from about 1 ppm to about 500 ppm and the silica scale inhibitor is added in the aqueous system in an amount ranging from about 1 ppm to about 100 ppm, and wherein the sulfide scale inhibitor disperses iron.

2. The method of claim 1, wherein the sulfide scale inhibitor comprises a copolymer of acrylic acid or methacrylic acid and an anionic monomer.

3. The method of claim 1, wherein the silica scale inhibitor comprises a copolymer of acrylic acid or methacrylic acid and an alkoxylated monomer.

4. The method of claim 2, wherein the anionic monomer is selected from the group consisting of 2-acrylamido-2-methylpropane sulfonic acid (AMPS), styrene sulfonic acid, 2-methyacrylimido-2-methylpropylsulfonic acid, vinyl sulfonic acid, sulfoalkyl acrylate, sulfoalkyl methacrylate, allyl sulfonic acid, 3-methacrylamido-2-hydroxypropylsulfonic acid, any salt thereof, and any combination thereof.

5. The method of claim 3, wherein the alkoxylated monomer is selected from the group consisting of hydroxypolyethoxy allyl ether (AAE), 3-allyloxy-1,2-propanediol, diethylene glycol monoallyl ether, tetraethylene glycol methyl vinyl ether, ethylene glycol vinyl ether, polyethoxy methacrylate, 1-allyloxy-2-hydroxypropane sulfonic acid, any salt thereof, and any combination thereof.

6. The method of claim 2, wherein the anionic monomer is AMPS.

7. The method of claim 3, wherein the alkoxylated monomer is hydroxypolyethoxy (10) allyl ether (AAE-10).

8. The method of claim 1, wherein the sulfide scale inhibitor comprises a copolymer, wherein the copolymer comprises from about 40% to about 80% by weight of acrylic acid and from about 20% to about 60% by weight of AMPS.

9. The method of claim 1, wherein the silica scale inhibitor comprises a copolymer, wherein the copolymer comprises from about 30% to about 70% by weight of acrylic acid and from about 30% to about 70% by weight of AAE-10.

10. The method of claim 1, wherein the composition is injected into a condenser in the aqueous system, wherein the condenser contains water or wherein the composition is injected into a separator in the aqueous system, wherein the separator contains water, or wherein the aqueous system comprises brine with a salinity from less than about 1,000 ppm to 300,000 ppm.

11. The method of claim 1, wherein the aqueous system is a geothermal system, wherein the geothermal system is a geothermal power plant selected from the group consisting of a dry steam station, a flash steam station, and a binary cycle station.

12. The method of claim 1, wherein the sulfide scale inhibitor comprises a copolymer with a weight average molecular weight ranging from about 1,000 Da to about 100,000 Da, wherein the silica scale inhibitor comprises a copolymer with a weight average molecular weight ranging from about 1,000 Da to about 100,000 Da, wherein the weight average molecular weight is determined using size exclusion chromatography.

13. The method of claim 1, wherein the sulfide scale is selected from the group consisting of iron sulfide, antimony sulfide, lead sulfide, zinc sulfide, and any combination thereof.

14. The method of claim 1, wherein the composition further comprises an additive selected from the group consisting of a hydrogen sulfide scavenger, a corrosion inhibitor, a dispersant, a gas hydrate inhibitor, a biocide, a surfactant, a solvent, an inert tracer, and any combination thereof.

15. The method of claim 1, wherein the composition is injected at a location in a wellbore that is from about 200 to about 400 feet below a lowest encountered scale formation site.

16. The method of claim 1, wherein inhibition of mixed deposits of iron silicate and iron sulfide by the composition was more than a sum of inhibition of mixed deposits of iron silicate and iron sulfide by the sulfide scale inhibitor and the silica scale inhibitor separately.

17. A method for sulfide and silica scale inhibition or reduction in a wellbore, comprising:
injecting a composition into the wellbore, wherein the wellbore comprises a temperature of about 185° C. to about 370° C., wherein the composition comprises a sulfide scale inhibitor and a silica scale inhibitor, wherein the sulfide scale inhibitor is added to the wellbore in an amount ranging from about 1 ppm to about 500 ppm and the silica scale inhibitor is added to the wellbore in an amount ranging from about 1 ppm to about 100 ppm, and wherein the sulfide scale inhibitor disperses iron.

18. The method of claim 17, wherein the sulfide scale inhibitor comprises a copolymer, wherein the copolymer comprises from about 40% to about 80% by weight of acrylic acid and from about 20% to about 60% by weight of AMPS.

19. The method of claim 17, wherein the silica scale inhibitor comprises a copolymer, wherein the copolymer comprises from about 30% to about 70% by weight of acrylic acid and from about 30% to about 70% by weight of AAE-10.

20. The method of claim 17, wherein inhibition of mixed deposits of iron silicate and iron sulfide by the composition was more than a sum of inhibition of mixed deposits of iron silicate and iron sulfide by the sulfide scale inhibitor and the silica scale inhibitor separately.

* * * * *

UNITED STATES PATENT AND TRADEMARK OFFICE
CERTIFICATE OF CORRECTION

PATENT NO. : 11,447,410 B2
APPLICATION NO. : 15/976977
DATED : September 20, 2022
INVENTOR(S) : Dinesh Mantri et al.

It is certified that error appears in the above-identified patent and that said Letters Patent is hereby corrected as shown below:

In the Claims

Column 9, Line 29, delete "2-methyacrylimido-2-methylpropylsulfonic acid" and insert therefore --2-methylacrylamido-2-methylpropanesulfonic acid--.

Signed and Sealed this
Twenty-seventh Day of December, 2022

Katherine Kelly Vidal
*Director of the United States Patent and Trademark Office*